C. H. LEAHAN.
AUTOMOBILE LOCK.
APPLICATION FILED SEPT. 23, 1918.
1,320,771.
Patented Nov. 4, 1919.
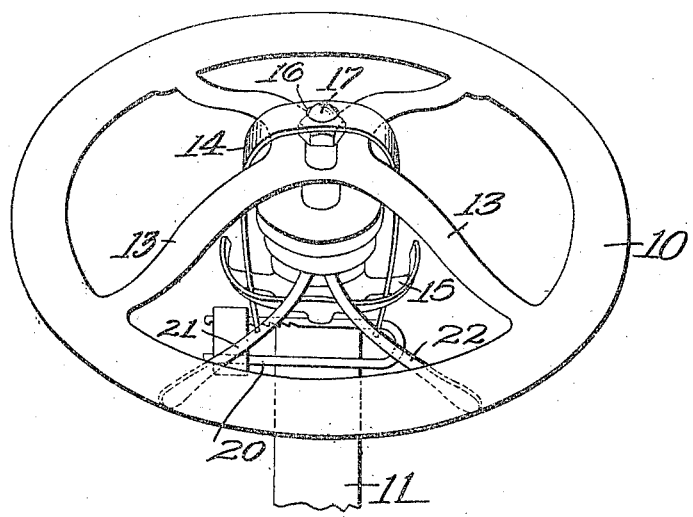
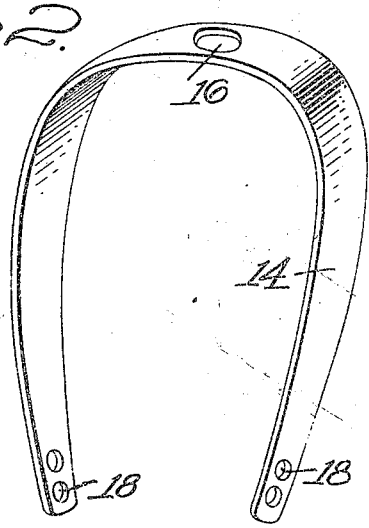
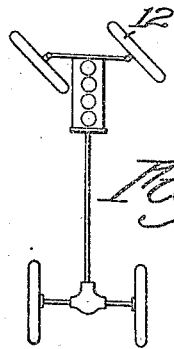

UNITED STATES PATENT OFFICE.

CHARLES HENRY LEAHAN, OF WARE, MASSACHUSETTS.

AUTOMOBILE-LOCK.

1,320,771.

Specification of Letters Patent.   Patented Nov. 4, 1919.

Application filed September 23, 1918.   Serial No. 255,227.

*To all whom it may concern:*

Be it known that I, CHARLES H. LEAHAN, a citizen of the United States, residing at Ware, in the county of Hampshire and State of Massachusetts, have invented a new and useful Automobile-Lock, of which the following is a specification.

This invention relates to a lock which, although especially designed for use on Ford cars of the present construction, is capable of use on other cars with or without material modifications.

The principal objects of the invention are to provide a lock of a type which can be applied to the car most conveniently when the front wheels are cramped and which will prevent their being turned into a straight position even if experienced parties are able to start the car in spite of the lock, which is frequently found to be the case with many kinds of locks. By combining the locking of the levers, which is the object of many kinds of locks as well as this one, with the locking of the front wheels in cramped position the possibility of starting the car up or towing it off under other power may still exist but it will be of no advantage to parties trying to take the car, because it can be driven or towed only in circles.

Another object of the invention is to provide a device of this character of extremely simple construction so that it can be made without material expense and can be made strong and heavy enough to avoid its removal by hack-saw or file without at least necessitating a long period of work in order to accomplish that. Further objects and advantages of the invention will appear hereinafter.

Reference is to be had to the accompanying drawings, in which—

Figure is is a view of the steering wheel of a Ford car with a preferred embodiment of this invention applied thereto shown in locked position;

Fig. 2 is a perspective view of the shackle of the lock and

Fig. 3 is a skeleton plan of the wheel base of the car showing the position in which it is locked by this device.

The invention is shown as applied to the steering wheel 10 mounted on the column 11 of the car. The steering wheel is so located that when the front wheels 12 are turned to the position shown in Fig. 3 or to the exact opposite position the arms 13 of the steering wheel come to an intermediate position, so that the shackle 14 of the lock can be placed over them, one arm between each two opposite sets of the wheel arms and its ends can be brought into the openings in the quadrant 15 with which the steering column is provided. An important feature of this invention consists in the cramping of the wheels when the car is left locked.

The shackle 14 is of a U-shaped form with a perforation 16 in the center of its top designed to receive the wheel nut 17 so as to locate the lock accurately in central position on the wheel and prevent also its being shifted from central position thereon. The arms of the shackle pass between the arms 13 of the steering wheel which, on account of the fixation of the arms against turning by passing through the openings in the quadrant, prevents the wheel from turning after the lock is applied. The two arms of the shackle pass down through the usual openings in the quadrant and are provided with perforations 18 below through which one arm of the hasp of any ordinary form of pad-lock 20 will pass as indicated in Fig. 1.

Normally when the car is stopped and intended to be left while the driver is away, the spark lever 21 and the throttle lever 22 are brought together as far as possible along the quadrants and are left in approximately central position as indicated in Fig. 1. Therefore the two arms of the shackle pass down at the sides of these levers and prevent either of them being moved away from the non-active position, so that these levers although not locked absolutely against any motion at all are locked against motion far enough to enable the car to be driven under ordinary circumstances.

There will be no need of describing the operation of the device after what has been said, as it is apparent that even the most inexperienced operator will, if he has ever seen a lock applied, be apt to apply it in the right position to prevent the moving of the car along the streets in the ordinary way even by towing. It will also be natural for him to lock the spark lever and throttle lever.

The simplicity of the device is obvious and the fact that it must necessarily be applied in the right place has been explained.

It is well understood, of course, that most automobile locks are of such a nature that experienced drivers are able to start the car without displacing or really tampering with the lock and even if they cannot do that they can tow the car far enough away to get time to remove the lock by means of a file or hack-saw. One of the most important results of this invention is that even that cannot be accomplished, and it cannot be even if the lock is carelessly placed so as to leave the spark and throttle levers free from it.

Although I have illustrated and described the invention as applied to a Ford car it will be understood of course that by simple modifications that can be made it can be applied to cars of other makes. Therefore I do not wish to be limited to the make of car or to all the details of construction herein shown and described, but what I do claim is:—

In a device of the class set forth, a U-shaped shackle consisting of a single piece of thin metal with arms depending between the spokes of the wheel and through openings in the quadrant, the shackle having an integral arched portion provided with a central nut-receiving perforation and its extreme lower ends being flat and in substantially parallel planes and provided with holes located centrally with respect to said perforation, and a locking device comprising a straight rod passing through both of said holes at a point below the quadrant, for the purpose set forth.

In testimony whereof I have hereunto affixed my signature.

CHARLES HENRY LEAHAN.